Aug. 16, 1932.  W. E. CRAWFORD  1,872,125

ELECTRIC FLASH WELDING

Filed March 21, 1931

INVENTOR.

William E. Crawford

BY

ATTORNEY.

Patented Aug. 16, 1932  1,872,125

UNITED STATES PATENT OFFICE

WILLIAM E. CRAWFORD, OF WAUWATOSA, WISCONSIN, ASSIGNOR TO A. O. SMITH CORPORATION, OF MILWAUKEE, WISCONSIN, A CORPORATION OF NEW YORK

ELECTRIC FLASH WELDING

Application filed March 21, 1931. Serial No. 524,283.

This invention relates to a method of electric flash welding seams of substantial length in plate or sheet metal and is particularly adapted to the welding of longitudinal seams in pipe sections.

The object of the invention is to provide a method whereby the flashing arc is more readily, rapidly and economically established throughout the length of the seam and without waste of metal of the edges.

A more specific object is to provide a method of shaping or preparing an edge or the edges to be welded which facilitates starting of the flashing arc simultaneously at a plurality of points or regions along the seam.

An embodiment of the invention is illustrated in the accompanying drawing in which.

Figure 1:
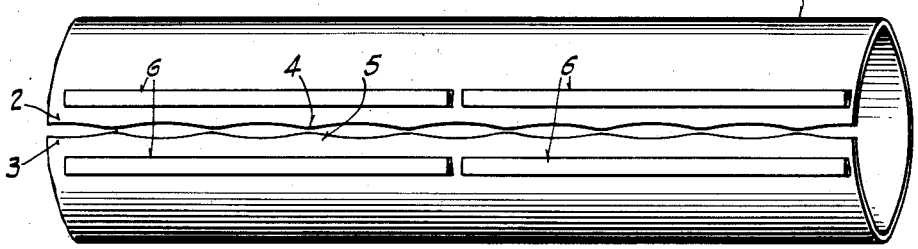
Figure 1 is a perspective view of a section of pipe showing the edges to be welded in spaced relation.

This application is a continuation in part of applicant's co-pending application Serial No. 306,419, filed September 17, 1928, for production of electrically welded sheet metal pipe.

In carrying out the invention in its preferred embodiment, the article, which may be a pipe section 1 of forty feet or so in length, part of which is shown in the drawing, has its edges 2 and 3 to be welded formed to provide a plurality of opposed projections or wave-like crests 4 and 5, respectively, which are preferably spaced at predetermined intervals along the edges. The spacing of the projections will depend upon the type of work being welded. The projections are preferably spaced about one to six inches apart, the latter being illustrated in the drawing in which the projections on each edge are shown as being in alignment to the respective projections on the other edge, transversely of the seam.

Figure 2:
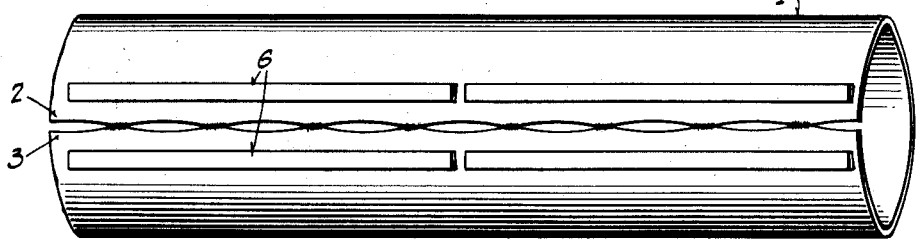
Fig. 2 is a similar view illustrating the initial stage of the flashing operation.
Figure 3:
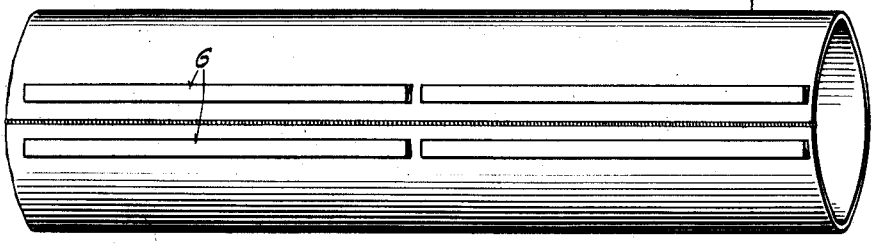
Fig. 3 is a similar view illustrating the final stage of the flashing operation.

The pipe section formed as above is placed in the welding machine, which preferably has a plurality of pairs of electrodes 6 adapted to feed the welding current to a plurality of predetermined regions along the seam, as shown in Figures 1 to 3.

The welding potential is applied to the edges preferably while they are spaced apart as shown in Figure 1.

The edges are then moved slowly together by suitable mechanical means in the machine (not shown) until the preformed projections 4 and 5 on the opposing edges 2 and 3 respectively come into contact and establish the welding current. The entire current flow is established across the edges through the meeting projections 4 and 5 and the heat thereby generated under the very light contact of the projections heats the meeting edges of the projections to a molten state and starts a flashing arc in the region of each pair of opposed projections, as shown in Fig. 2.

Thereafter the movement of the edges toward each other is continued slowly at a rate determined by the characteristics of the flashing arcs and the flashing away of the metal of the edges, to effect a spreading of each flashing arc along the region adjacent thereto until the several arcs meet and produce a single continuous arc extending from edge to edge for the full length of the seam, as illustrated in Fig. 3. This spreading of the flashing arc is facilitated by the shape of the projections as shown in the drawing, the projections having inclined sides extending from the initial points of contact to the points intermediate the projections at which the contact or flashing arc is last established, it being preferable that the projections of one edge form with the other edge a plurality of angular spaces with substantially no portion in which the directly opposing edges are parallel to each other longitudinally of the seam.

It is preferable to have the projections as small as possible, it being found suitable in welding pipe as above set forth to employ projections on each edge approximating one thirty-second of an inch in depth in order to prevent undue softening of the metal beneath the projections at a time when the flashing arcs are spreading. Where the projections are on only one edge, it may be advisable to employ projections having a depth approximating one sixteenth of an inch.

Figure 4:
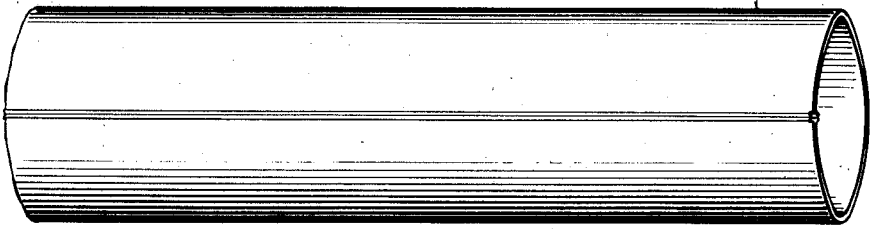
Fig. 4 is a similar view of the welded pipe section.

When the uniform flashing arc produced as above set forth has heated the edges uniformly to the required welding temperature, the edges are suddenly abutted together under pressure to effect a welding thereof and produce an integral pipe section, as illustrated in Fig. 4.

The present invention has resulted in a considerable saving of time in the flashing period since it is possible to establish and spread the several flashing arcs along the seam, thereby creating a continuous arc more quickly than would be possible where projections on the edges are not employed. The advance of the edges during the starting of the flashing arc need not be as carefully controlled nor as slow in order to prevent sticking of the edges together, nor is it necessary to employ as high a starting voltage across the edges to maintain the flashing arc during the early initial stages of its establishment.

Another of the features of the process facilitated by the invention lies in the ability to start the arc and continue the flashing operation with only a forward movement of the edges and without a reversal in movement at any time.

Instead of forming the projections 4 and 5 on both edges, it is entirely satisfactory to form the projections on only one edge leaving the other edge substantially straight.

I claim:

1. The method of making pipe in sections of extreme length from sheets of metal which consists in bending each sheet into the form of a tube and forming at least one of the side edges of the sheet to provide a plurality of projections at predetermined intervals along the same, applying welding potential to the opposed spaced apart edges to be welded, moving said edges toward each other at a rate sufficiently slow to effect a heating and flashing off of the projections upon their coming into contact with the opposite edge to thereby establish the flashing arc at predetermined intervals along the seam, continuing the movement of said edges to progressively bring more of the length thereof into arcing relation and to cause additional flashing off of the metal of the edges until the several flashing arcs are merged into a single arc extending from edge to edge and continuous for the full length of the seam to thereby uniformly heat the edges to welding temperature, and thereafter discontinuing the application of the current and quickly pressing the heated edges together to effect a simultaneous and continuous union thereof, thereby producing an integral pipe section.

2. The method of making pipe sections of extreme length by flash welding a longitudinal seam thereof, which comprises forming at least one of the longitudinal edges to be welded to provide projections thereon extending toward the opposite edge, applying a welding potential to the opposed spaced apart edges, establishing a flashing arc between the edges in the regions of said projections at a plurality of distributed points along the edges and spreading said arc to extend simultaneously for the full length of the edges to thereby heat the edges uniformly to welding temperature, and thereafter pressing the heated edges together to effect the simultaneous and continuous union thereof and thereby produce an integral pipe section.

3. The method of flash welding an extended seam which comprises forming on one of the edges to be welded a plurality of projections spaced at predetermined intervals along the same, applying the welding potential to the edges and establishing a welding current across the meeting edges to heat and flash away said projections and thereby establish a plurality of flashing arcs at predetermined intervals along the seam, thereafter moving the edges toward each other at a rate which will maintain the several flashing arcs and spread the same to regions adjacent thereto until a single flashing arc is obtained extending from edge to edge continuously for the full length of the seam to thereby uniformly heat the edges to welding temperature, and finally pressing the heated edges together to effect a simultaneous welding thereof.

4. In electric flash welding, the steps of forming one of the edges to provide a series of projections thereon having inclined sides which when abutted against the other edge form angular spaces between the edges in which substantially no portions of the directly opposed edges are parallel longitudinally of the seam, establishing the flashing arc initially at the points of contact of the projections with the other edge and moving the edges toward each other to spread the initial flashing arcs to points where they merge with one another, and after the edges have become heated to the required temperature, applying pressure thereto to weld the same together.

In witness whereof, I have hereunto subscribed my name at Milwaukee, Wisconsin, this 19th day of March, 1931.

WILLIAM E. CRAWFORD.